United States Patent

[11] 3,616,024

[72] Inventor Tommy J. Windle
      Bartlesville, Okla.
[21] Appl. No. 841,428
[22] Filed July 14, 1969
[45] Patented Oct. 26, 1971
[73] Assignee Phillips Petroleum Company

[54] METHOD AND APPARATUS FOR WELDING HEAT SEALABLE PIPES
9 Claims, 8 Drawing Figs.
[52] U.S. Cl. .................................................. 156/257,
      156/153, 156/293, 156/304, 156/423, 156/517,
      285/21, 285/156
[51] Int. Cl. ..................................................... B32b 31/00
[50] Field of Search .......................................... 156/153,
      158, 293, 304, 423, 502, 257, 503, 517, 518, 258;
      285/21, 155, 156

[56] References Cited
UNITED STATES PATENTS
1,727,413  9/1929  Root ............................. 285/156 X
3,013,925  12/1961 Larsen .......................... 156/153

Primary Examiner—Carl D. Quarforth
Assistant Examiner—R. L. Tate
Attorney—Young and Quigg ABSTRACT: T- and Y-joints are formed by welding the butt end of a first pipe of heat sealable material, such as polyethylene, to a continuous second pipe of heat sealable material, such as polyethylene, by aligning the axis of both pipes in a common plane, removing a shaped section of pipe wall from the continuous pipe and removing a portion of the butt end of the first pipe so as to form the butt end into a complementary shape to that of the removed shaped section of the continuous pipe, heating, preferably simultaneously, the shaped sections and pressing the pipes together to form a joint that will provide for fluid communication between the pipes.

INVENTOR.
T.J. WINDLE

INVENTOR.
T.J. WINDLE

ATTORNEYS

METHOD AND APPARATUS FOR WELDING HEAT SEALABLE PIPES

This invention relates to welding pipes of heat sealable material so as to form joints that will provide for fluid communication between the pipes.

Although use of heat sealable materials for the fabrication of pipes for fluid transportation systems has increased, a more complete conversion from metal pipes to pipes of heat sealable materials has been retarded by the lack of a satisfactory method for forming high strength joints of such pipe. Due in part to cold-flow and notch-sensitivity characteristics of many heat sealable materials employed for this purpose, conventionl threaded couplings and adhesives have been found completely unsatisfactory for forming joints and it has become necessary to weld the joints of pipe together to form a fluidtight joint.

Conventional methods for forming butt joints in thermoplastic pipes have included the hot gas welding method which involves in one adaptation the pushing of a welding rod of the heat sealable, preferably thermoplastic, material into a groove formed by the abutment of two tube ends having the outside edges beveled. Alternatively, another adaptation of the hot tool welding method has been used which involves heating the ends of the tube sections and bringing the heated ends together while in a softened condition so as to form a weld upon cooling of the material. These prior art methods have not been entirely satisfactory for the reason that considerable skill is required in achieving a fluidtight weld, the weld, although fluidtight, is generally much weaker than the remaining sections of pipe, and the welding operation is time consuming.

Specifically, in the second adaptation of hot tool welding mentioned above, the heat sealable parts to be welded are brought into direct contact with a heating element or hot plate. Once sufficient molten material is obtained to form the joint, they are removed, butted together quickly and held under pressure until the joint cools and solidifies sufficiently to be self-supporting. This technique offers many commercial advantages. Multistory laboratory buildings or office buildings can be equipped with water systems which are fused into an integrated lattice of pipes. Also, pipes can be joined into integrated units in field operations such as in a natural gas distribution system or an oil field distribution system. Although the hot tool welding method is commonly used, the joints produced are greatly inferior to the parent material in terms of burst strength. Thus, the prior art suggests no method of using the hot tool welding method to produce joints of burst strength equivalent to that of the parent pipe.

Thus, according to this invention, joints are formed by welding the butt end of a pipe of heat sealable material to a continuous pipe of heat sealable material so as to provide for fluid communications between said pipes. This is accomplished by aligning the axis of both pipes in a substantially common plane and removing a shaped section of pipe wall from the continuous pipe and removing a portion of the butt end of the other pipe so as to form the butt end into a complementary shape to that of the removed shaped section of the continuous pipe. Both the shaped section from the continuous pipe and the complementary-shaped butt end are then heated by suitable heating elements, preferably simultaneously, and pressed together so as to form a heat sealable joint possessing generally the same burst strength as the pipes.

Accordingly, it is an object of his invention to provide an improved method for joining thermoplastic pipe.

Another object of this invention is to provide method and apparatus for welding the ends of pipe sections formed from thermoplastic materials.

Another object of my invention is to provide method and apparatus for welding pipe sections together in a field location.

Another object of this invention is to provide pipe sections joined into an integrated, continuous array of pipes such as would be found during the construction of a building, a natural gas distribution system or an oil field pipe system.

Other objects, advantages and features of this invention will be readily apparent to those skilled in the art from the following drawings and appended claims.

The attached Figures represent only one embodiment of the invention as other embodiments will be directly apparent to one skilled in the art. Specifically, FIG. 1 represents an embodiment of the invention in its portable form joining pipe in a field location.

Figure 7:
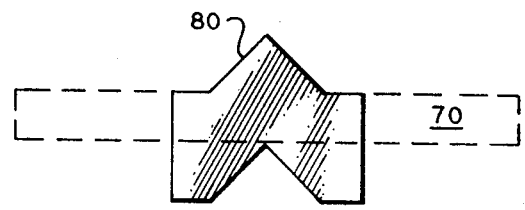
Figure 8:
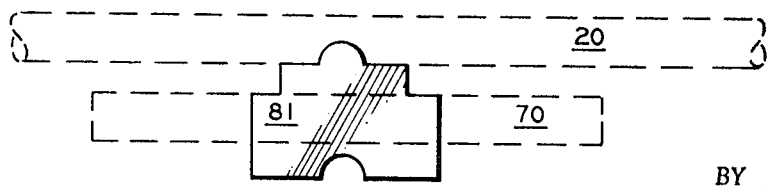

FIGS. 7 and 8 indicate various embodiments of the heating element capable of being used in this invention.

Figure 1:
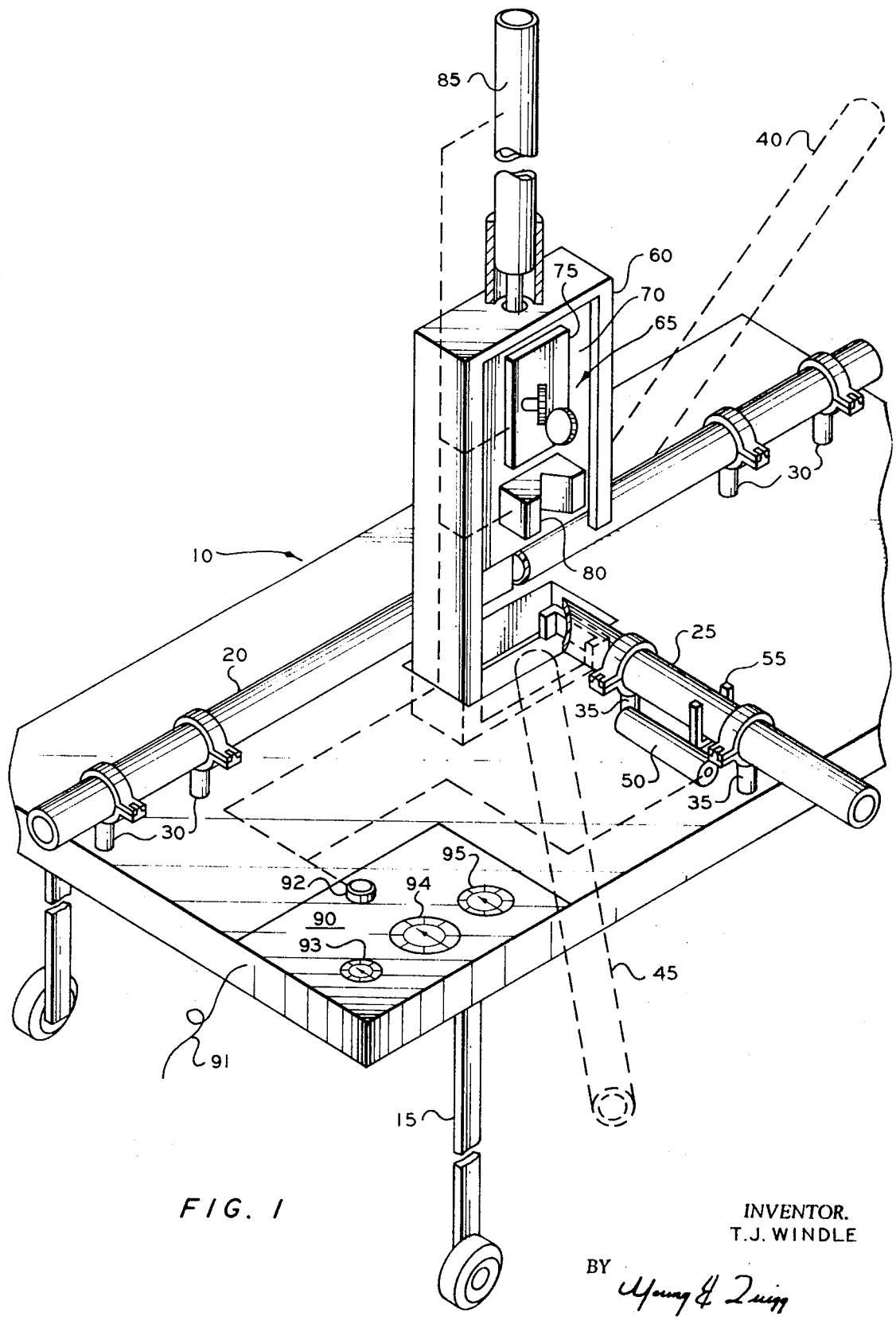

Thus, in FIG. 1, there is illustrated one embodiment of the invention particularly useful for practicing the invention in a field location. The apparatus comprises a supporting frame generally designated as 10 which is mounted on adjustable legs 15 so as to be raised or lowered to accommodate the elevation of the continuous pipe which can be one pipe of an entire system of pipes. Additionally, there is indicated a continuous second pipe 20 of heat sealable material and a pipe 25 of heat sealable material having a butt end.

According to this invention, the pipes must be of heat sealable material in order to be welded into joints by this invention. More specifically, the heat sealable material can comprise thermoplastic material and, in one embodiment, the thermoplastic material can be selected from the group consisting of polyethylene, polypropylene, ethylene-propylene copolymers, and ethylene 1-butene copolymers. In a preferred embodiment, polyethylene is used. In one embodiment where polyethylene is used, it has a density range of 0.930–0.990 gram per cubic centimeter at 25° C.

The axes of both pipes are positioned in a substantially common plane by the use of a plurality of brackets 30 and 35 on frame 10. Pipe 20 is nonslidably positioned by brackets 30 whereas pipe 25 is slidably positioned by brackets 35.

Brackets 30 and 35 can be positioned in various ways on frame 10 and, specifically, could be positioned so as to form a Y-joint by bending pipe 20 and positioning one end along the dotted region designated as 40. The Y-joint will then be formed by positioning brackets 35 so as to slidably position pipe 25 in the dotted region designated as 45.

Additionally, in FIG. 1, there is indicated means 50 to move pipe 25 along its axis so as to form a joint with pipe 20. Means 50 grasps pipe 25 by grasping means 55 which can be frictionally or spring-loadably adapted to grasp pipe 25. Additionally, there is indicated in FIG. 1 removal and heating means which means comprises a frame 60 adapted to mount a cutting and heating assembly 65 for slidable movement substantially perpendicular to the plane of the pipes. Cutting and heating assembly 65 further comprises a mounting block 70, a cutting element 75 mounted in said block and extended on either side of said block adapted to simultaneously cut the pipes when slid thereby and a heating element 80 mounted in said block extending one either side of said block and adapted to simultaneously heat the region of the removed shaped section of the pipes to achieve heat-sealing conditions. Additionally, there is indicated means 85 to position the cutting and heating assembly in a sequence of positions so as to conduct the joining operation.

Means 50, means 85, cutting element 75, and heating element 80 are all connected to control panel 90 which comprises suitable circuitry that when powered by a suitable source, such as extension cord 91, the device can be caused to operate according to a sequence, which will be later described, by actuating starter button 92. The joining time, the heating time, and the heating element temperature can be adjusted to correspond to the particular type of pipe being sealed by adjusting dials 93, 94, and 95, respectively.

Figure 5:
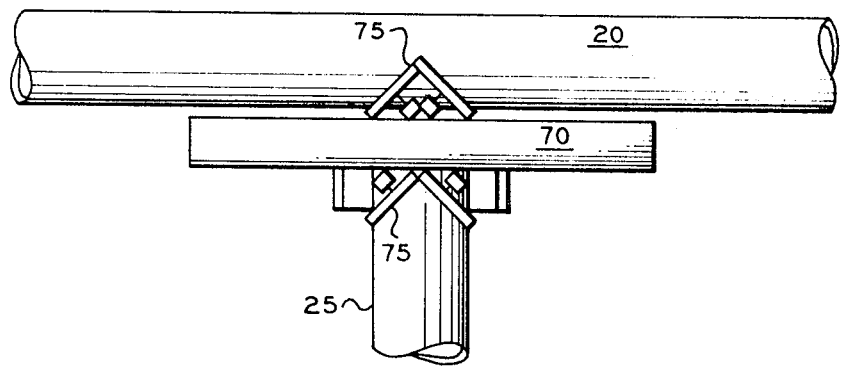
FIGS. 5 and 6 represent a plan and elevation view, respectively, of one embodiment of the cutting and heating elements of this invention.
Figure 6:
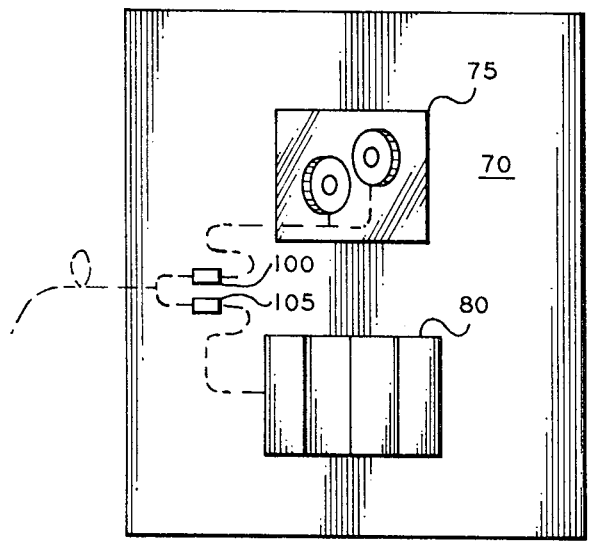

Referring now to FIGS. 5 and 6, there is indicated a plan and elevation view, respectively, of the cutting and heating assembly alone showing mounting block 70, cutting element 75, and heating element 80. In one embodiment, cutting element 75 is electrically powered and is connected to control panel 90 with a connection 100. Also, in this embodiment, heating element 80 is electrically powered and is connected to control panel 90 by connecting means 105. Connections 100 and 105 adapt the invention to conveniently and rapidly accommodate various types of cutting elements and heating elements as will be subsequently explained.

It is fully within the scope of this invention to remove, preferably by cutting, any sort of shaped section from pipe 20 and to remove, preferably by cutting, a complementary-shaped section from pipe 25 so as to provide for joining when they are heated and pressed together. As noted in FIGS. 1, 5 and 6, the shaped section in this embodiment is such that the projection of the shaped section is triangular when projected into the plane in which the two pipes reside. Of course, any other shapes desired by the user can be selected and cutting element 75 adapted to cut said shape and heating element 80 adapted to heat the shaped section. Cutting element 75 can be powered by other means than electrical means, such as pneumatic, and can consist of other devices than saws, such as grinders, etc. As noted in FIG. 7, heating element 80 consists of an element adapted to heat the triangular cut used in one embodiment of the invention. When other shapes are selected, the heating element like the cutting element, must be adapted for this particular shape.

As noted in FIG. 8, there is indicated another embodiment where heating element 81 is adapted to heat a semicircular shape in pipe 20 and further adapted to heat complementary semicircular shape butt end of pipe 25. Additionally, it is to be noted that element 81 has been constructed so as to reflect the positioning of a smaller pipe farther away from the region of the cutting and heating assembly as it slides downward. Thus, means 30 can be adapted to hold different size pipes and any spacing difference existing can be compensated for by the configuration of heating element 81. Although heating element 80 in this embodiment is electrically powered, other means to power the element can be used such as a gas-fired element.

Thus, having described the apparatus of this embodiment of the invention, the operation of such will be described. In order to conduct a joining operation, frame 10 is adjusted by use of adjustable legs 15 so as to position the holding means 30 and 35 in the plane which pipe 20 normally resides, since in this embodiment it is one member of an integrated lattice of pipes which is connected at several other locations and forms a lattice of piping in a building.

Figure 2:
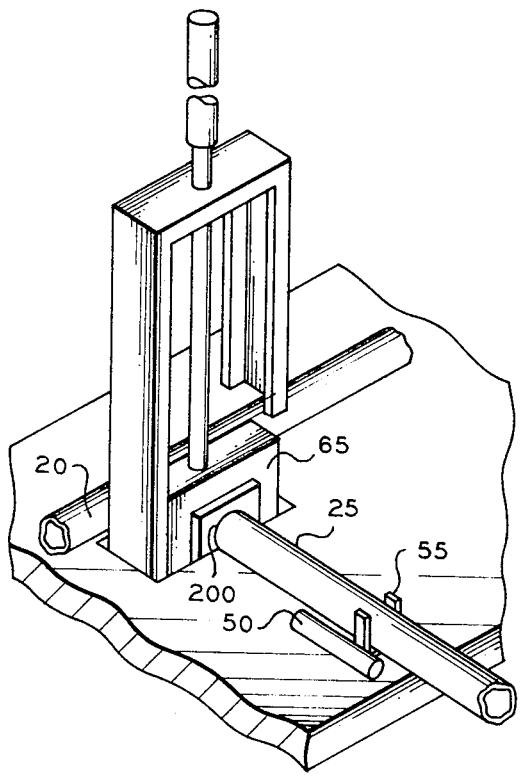
FIGS. 2, 3 and 4 represent the operation shown in its sequential steps.

After the invention is suitably powered, such as by connecting extension cord 91 to a source of power, starter button 92 is initially depressed and means 85 causes the cutting and heating assembly 65 to slide down to its initial position as designated in FIG. 2. Frame 10 is then positioned so as to cause means 30 to nonslidably grasp pipe 20. At that time, pipe 25, which is to be joined to pipe 20, is then slidably positioned in means 35 and is moved forward so as to contact the butt end 200 of pipe 25 with the upper portion of cutting assembly 75. After end 200 is placed against cutting assembly 75, grasping means 55 is attached.

Figure 3:
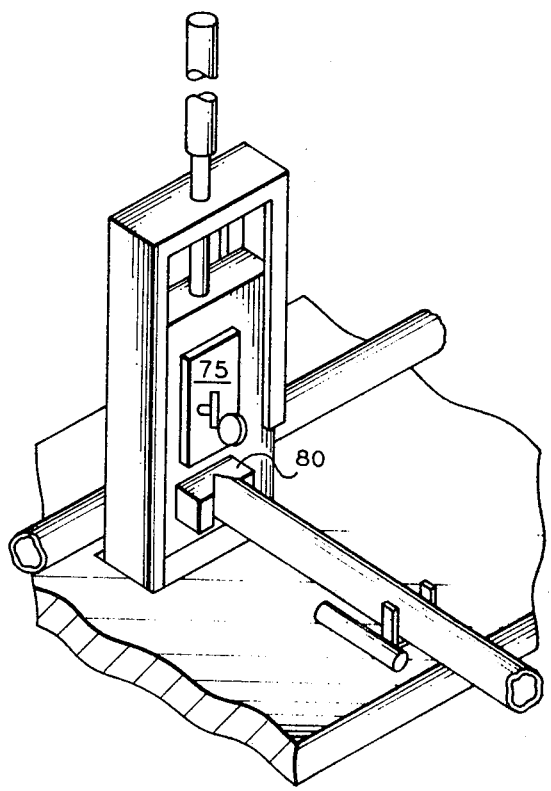

Thus, according to this invention, starter button 92 is depressed for the second time and means 85 moves the cutting and heating assembly from the position illustrated in FIG. 2 to the position illustrated in FIG. 3. As the cutting and heating assembly is slid past pipe 20 and pipe 25, cutting element 75 cuts a portion of the wall of pipe 20 so as to form a shaped section therein and simultaneously removes a portion of the butt end of the other pipe so as to form the butt end into a complementary shape to that of the removed section of the second pipe. Mans 85 causes cutting and heating assembly 65 to then stop so as to position heating element 80 so as to heat to heat-sealing temperature the continuous pipe in the region of the face of the removed section of pipe wall and also to simultaneously heat to heat-sealing temperature the first pipe in the region of the face of the complementary shape. As has been noted earlier, dial 94 can be adjusted so as to control the residence time that means 85 positions heating element 80 as shown in FIG. 3. Additionally, dial 95 can be adjusted so as to adjust the heater temperature of heater element 80.

Figure 4:
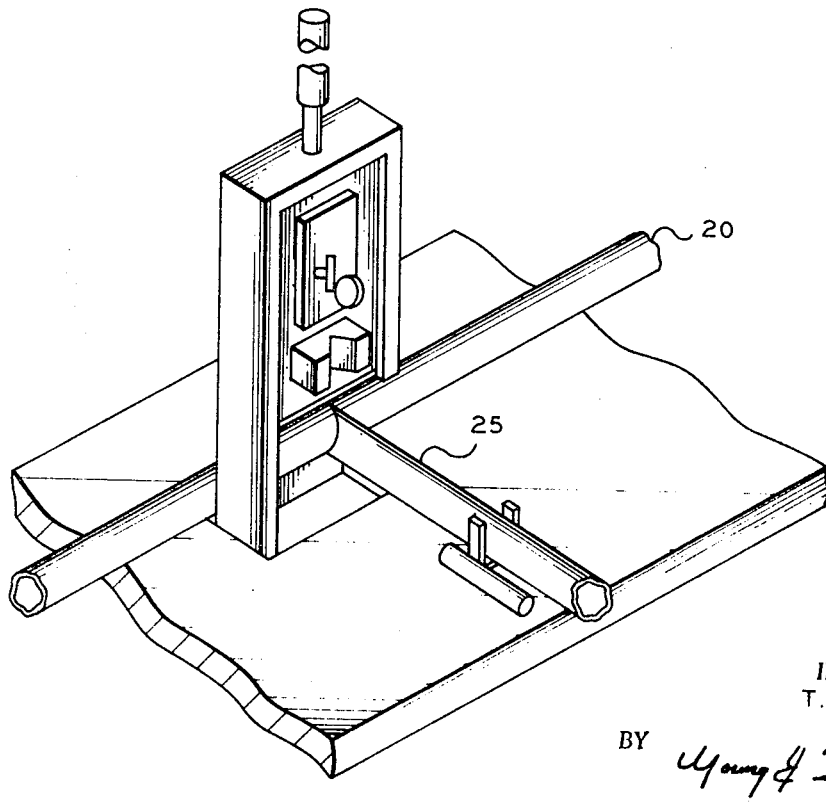

Thus, after the elapsation of the time previously set in dial 94, means 85 slides the cutting and heating assembly up to the position indicated in FIG. 4 and means 50 presses pipe 25 into pipe 30 until the temperature of the heated region is reduced to below that of the heat-sealing temperature. Means 50 presses the pipes together with a pressure within the range of about 1 to 100 p.s.i., although in one embodiment the pressure can be within the range of about 5 to 25 p.s.i.

The joining time can comprise any time sufficient to allow the heated regions to cool below the heat-sealing temperature and the heating temperature can comprise any temperature of heat-sealing intensity when used with the particular pipe material.

In one embodiment the heater temperature is adjusted so as to heat the pipes in the region of the removed portions of pipe wall within a temperature range of about 300° to 400° F. The heating time can vary from about 1 second to about 1 hour.

Thus, this invention is broadly applicable to welding pipes of heat sealable materials so as to provide a joint adapted for fluid communication.

Various modifications of this invention can be made in view of the foregoing disclosure and appended claims without departing from the spirit or scope thereof. Specifically, as noted, heating element 80 can be composed to conform to a variety of shapes, cutting element 75 can be composed to cut various shapes by various means and the invention can be adapted to heat-seal many types of pipes of heat sealable material.

I claim:

1. A method of welding the butt end of a first pipe of heat sealable material to a continuous second pipe of heat sealable material so as to provide for fluid communication between said pipes comprising the steps of:
   a. aligning the axes of both pipes in a substantially common plane;
   b. removing a shaped section of pipe wall from the second pipe;
   c. removing a portion of the butt end of the first pipe so as to form the butt end into a complementary shape to that of the removed shaped section of the second pipe;
   d. heating to heat-sealing temperature the second pipe in the region of the face of the removed section of pipe wall;
   e. heating to a heat-sealing temperature the first pipe in the region of the face of the complementary shape;
   f. pressing together the shaped section removed from the wall of the second pipe and the complementary-shaped butt so as to form a joint; and
   g. reducing the temperature of the heated region to below heat-sealing temperature.

2. The method of claim 1
   a. wherein said heat sealable material comprises thermoplasitc material; and
   b. wherein said first and second pipes are substantially simultaneously heated.

3. The method of claim 2 wherein said thermoplastic material is selected from the group consisting of polyethylene, polypropylene, ethylene-propylene copolymer, and ethylene-1-butene copolymers and further comprising: a. stationarily positioning the axis of said continuous pipe in a plane;
   b. movably positioning the axis of said first pipe in the same plane, said pipe being adapted to move along the direction of the axis of the first pipe so as to contact the butt of the first pipe with the second pipe;
   c. cuttably removing a regularly shaped section of pipe wall from the second pipe in the region where the butt end of the first pipe contacts said second pipe;
   d. cuttably removing a portion of the butt end of the first pipe so as to form the butt end into a complementary regular shape to that of the removed regularly shaped section of the second pipe;

e. heating the second pipe in the region of the face of the removed section of pipe wall within a temperature range of about 200°–500° F. for a sufficient time so as to bring the wall face to heat-sealing temperature;
f. substantially simultaneously heating the first pipe in the region of the face of the complementary shape within a temperature range of 200°–500° F. for a sufficient time so as to bring the face to heat-sealing temperature and
g. pressing, within the pressure range of about 1 –100 p.s.i., the two pipes together by moving the first pipe along the direction of the axis so as to contact the face of the complementary-shaped butt end with the face of the second pipe wall resulting from removing a section of pipe wall from said second pipe.

4. The method of claim 3
a. wherein said first and second pipes are of polyethylene within a density range of 0.930–0.990 gms. /cm.³ at 25° C.;
b. wherein said first and second pipes are heated within the temperature range of about 300°–400° F. for about 1 second to about 1 hour and
c. wherein said first and second pipes are pressed together with a pressure in the range of from about 5–25 p.s.i.

5. The method of claim 4
a. wherein said continuous second pipe is simultaneously straight;
b. wherein said first pipe is oriented substantially perpendicular to said second pipe; and
c. wherein the projection of said shaped section removed from said second pipe is triangular in the plane in which the two pipes reside.

6. Apparatus for joining the butt end of a first pipe of heat sealable material to a continuous second pipe of heat sealable material so as to provide for fluid communication between said pipes comprising in combination:
a. a means to position the axes of both pipes in a substantially common plane;
b. a means to remove a shaped section of pipe wall from the second pipe;
c. a means to remove a portion of the butt end of the first pipe so as to form the butt end into a complementary shape to that of the removed shaped section of the second pipe;
d. a means to heat to heat-sealing temperature the second pipe in the region of the face of the removed shaped section of the second pipe;
e. a means to substantially simultaneously heat to a heat-sealing temperature the region of the face of the complementary shape; and
f. a means to press together the heated shaped section removed from the wall of the second pipe and the heated complementary-shaped butt end so as to form a joint.

7. The apparatus of claim 6
a. wherein said means to position the axis of pipes in a substantially common plane further comprises:
 1. a means to stationarily position said second pipe, and
 2. means to movably position said first pipe, said means adapted to move said first pipe along the direction of the axis of the first pipe so as to contact the face of the complementary-shaped butt end with the face of the second pipe wall resulting from removing a section of pipe wall from said second pipe;
b. wherein said removal and heating means further comprises means adapted to
 1. substantially simultaneously remove by cutting a shaped section of pipe wall from the second pipe in the region where the first pipe is adapted to contact the second pipe and to remove by cutting a portion of the butt end of the first pipe so as to form the butt end into a complementary shape to that of the removed shaped section of the second pipe, and
 2. substantially simultaneously heat, to heat-sealing temperature, the second pipe in the region of the face of the removed shaped section of the second pipe and to heat, to heat-sealing temperature, the first pipe in the region of the face of the complementary shape; and
c. wherein said means to press together the heated shaped section removed from the wall of the second pipe and the heated complementary-shaped butt end of the first pipe further comprises means to move the first pipe along the direction of its axis so as to contact the face of the second pipe wall.

8. The apparatus of claim 7 consisting of a portable pipe joiner wherein said means are mounted on a hand portable structure
a. wherein said removal and heating means further comprises:
 1. a frame adapted to mount a cutting and heating assembly for slidable movement substantially perpendicular to the plane of the first and second pipes;
 2. a cutting and heating assembly comprising:
  a. a mounting block,
  b. a cutting element mounted in said block and extending on either side of the said block adapted to simultaneously cut both the first and second pipe when slid thereby, and
  c. a heating element mounted in said block and extending on either side of said block and adapted to simultaneously heat the region of the shaped portion of the first and second pipe to achieve heat-sealing conditions; and
b. further comprising a means to position the cutting and heating assembly in an initial position, and slide said assembly to a cutting position, wherein said cutting element cuts the shaped section out of the first and second pipe, and further slide assembly to a heating position, wherein said heating element simultaneously heated both shaped sections to heat-sealing conditions, and still further slide the assembly away from the region of the shaped sections.

9. The apparatus of claim 8
a. wherein said second pipe is a straight pipe;
b. wherein said first pipe is movably positioned substantially perpendicular to said second pipe;
c. wherein said cutting element further comprises a plurality of electrically powered saws adapted to cut shaped sections from said first and second pipes, said shaped sections characterized as having a triangular projection in the plane of the two pipes; and
d. wherein said heating element is electrically powered and a first portion of said element is substantially in the same size and configuration and is adapted to fit against the shaped section of the second pipe and a second portion is substantially the same size and configuration and is adapted to fit against the shaped butt end of the said first pipe.

* * * * *